US012558664B2

(12) United States Patent
Selivanov

(10) Patent No.: US 12,558,664 B2
(45) Date of Patent: Feb. 24, 2026

(54) METHOD OF CREATING PARAMETRIC RESONANCE OF ENERGIES IN THE ATOMS OF CHEMICAL ELEMENTS IN A SUBSTANCE

(71) Applicant: NATURAL RESOURCE BENEFICIATION LIMITED, Pewsey (GB)

(72) Inventor: Nikolay Ivanovich Selivanov, Ekaterinburg (RU)

(73) Assignee: NATURAL RESOURCE BENEFICIATION LIMITED, Pewsey (GB)

( * ) Notice: Subject to any disclaimer, the term of this patent is extended or adjusted under 35 U.S.C. 154(b) by 407 days.

(21) Appl. No.: 16/621,331

(22) PCT Filed: Jun. 14, 2017

(86) PCT No.: PCT/RU2017/000410
§ 371 (c)(1),
(2) Date: Dec. 11, 2019

(87) PCT Pub. No.: WO2018/231086
PCT Pub. Date: Dec. 20, 2018

(65) Prior Publication Data
US 2020/0197898 A1 Jun. 25, 2020

(51) Int. Cl.
B01J 19/10 (2006.01)
B01F 27/27 (2022.01)
(Continued)

(52) U.S. Cl.
CPC ........... B01J 19/10 (2013.01); B01J 19/0053 (2013.01); B01J 19/1806 (2013.01); B01F 27/27 (2022.01)

(58) Field of Classification Search
None
See application file for complete search history.

(56) References Cited

U.S. PATENT DOCUMENTS 6,016,798 A * 1/2000 Selivanov ............ B01J 19/1887
122/26
2006/0153676 A1 7/2006 Obinelo et al.
2013/0048486 A1 * 2/2013 Castillo .................... B01J 19/10
204/157.47

FOREIGN PATENT DOCUMENTS

CN 1181719 A 5/1998
EP 0826416 A1 3/1998
(Continued)

OTHER PUBLICATIONS

Wikipedia, "Scientific notation". Retrieved from wikipedia.org on Jan. 10, 2025. (Year: 2025).*
(Continued)

*Primary Examiner* — Jennifer A Leung
(74) *Attorney, Agent, or Firm* — Pillsbury Winthrop Shaw Pittman, LLP

(57) ABSTRACT

A method and an apparatus for creating parametric resonance of energies in atoms of chemical elements in a substance. The method and device are based on the excitation of chemical elements in the composition of the substance by creating artificial conditions for Bohr orbits in atoms of chemical elements using a rotary exciter. The method includes feeding the substance into the inner cavity of the rotor, its passing through the grooves (4) evenly distributed over the peripheral surface, followed by the release of the treated substance. The device includes a housing including a base (1) and a side wall, while the inner space of the housing is made in the form of separate grooves (4), evenly located relative to the outer surface of the rotor, a peripheral annular wall (8), input (5) and output (6) branch
(Continued)

pipes. The disclosed method and device provide parametric resonance in atoms of chemical elements in the substance between the energy of the "stationary waves" de Broglie and the electromagnetic energy of corresponding Bohr orbits.

3 Claims, 1 Drawing Sheet

(51) Int. Cl.
    B01J 19/00      (2006.01)
    B01J 19/18      (2006.01)

(56) References Cited

FOREIGN PATENT DOCUMENTS

| | | | | | |
|---|---|---|---|---|---|
| RU | 2002130243 | A | | 3/2004 | |
| RU | 2232630 | C2 | * | 7/2004 | ............... B01J 19/10 |
| WO | 01/58582 | A1 | | 8/2001 | |

OTHER PUBLICATIONS

Wikipedia, "e (mathematical constant)". Retrieved from wikipedia. org on Jan. 10, 2025. (Year: 2025).*

Supplementary European Search Report dated Mar. 26, 2021, issued in corresponding European Patent Application No. EP 17913981.1 (4 pgs.).

EPO Form 1703 European Search Opinion dated Mar. 26, 2021, issued in corresponding European Patent Application No. 17913981.1 (10 pgs.).

A. Amjadimanesh et al., "Effect of blade type on a 3D FC centrifugal fan", Journal of the Serbian Society for Computational Mechanics, vol. 8, No. 1, Jan. 4, 2014, pp. 23-35.

Office Action dated Aug. 6, 2024, issued in corresponding Canadian Patent Application No. 3,183,846 (4 pgs.).

David Murgist, "Attrition Grinding Mill Design", Jun. 9, 2017, Retrieved from the Internet: URL:https://www.911metallurgist.com/attrition-grinding-mill-design/ [retrieved on Mar. 17, 2021] (49 pgs.).

M. Inkyo, "Novel Nanoparticles Dispersing Beads Mill With Ultra Small Beads and Its Application", NSTI-Nanotech 2010, vol. 5, Dec. 31, 2010, pp. 141-144.

Richard H. Snow et al., "Particle-Size Analysis Particle-Size Distribution" Perry Chemical Engineering Handbook, Dec. 31, 1995, Retrieved from the Internet: URL:http:f/204.130.155.52/physics/chemistry/Perry's%20Chemical%20Engineering%20Handbook/Chap20.pdf [retrieved on Mar. 17, 2021] (70 pgs.).

Office Action dated Mar. 15, 2024, issued in corresponding Mexican Patent Application No. MX/a/2019/015118 with English translation (12 pgs.).

"Improving Fan System Performance a Sourcebook for Industry", Apr. 1, 2003 (92 pgs.).

First Office Action dated Jun. 28, 2021, issued in corresponding Chinese Patent Application No. 201780092126.8 (English Translation—7 pgs.).

Results of Substantive Examination Stage I, dated Jul. 23, 2021, issued in related Indonesian Patent Application No. P002020000213 with English translation (9 pgs.).

* cited by examiner

METHOD OF CREATING PARAMETRIC RESONANCE OF ENERGIES IN THE ATOMS OF CHEMICAL ELEMENTS IN A SUBSTANCE

CROSS-REFERENCE TO RELATED APPLICATIONS

This is the U.S. National Stage of PCT/RU2017/000410, filed Jun. 14, 2017, the contents of which is incorporated herein by reference in entirety.

Technical Field

The invention relates to the field of mechanochemistry, in particular to selective excitation of chemical elements in solid, liquid, and gas substances by creating artificial conditions of the Bohr orbits in the atoms of chemical elements in the macrocosm and can be applied in various fields of the national economy, in particular petrochemical, including removal sulfur from oil, selective enrichment of minerals from ore in mining and metallurgy, increasing chemical activity of mineral fertilizers in agriculture, water purification to remove salts from water, including seawater, etc.

Description of Related Art

In the microcosm conditions, there are "stationary Bohr orbits" on which de Broglie waves exist, the terms are electromagnetic energies in the form of photons, and electrons as physical bodies having a discrete frequency of circular rotation around the nucleus of an atom. De Broglie waves manifest themselves in "stationary Bohr orbits" as a separate type of energy. When the speed of the "stationary wave" is equal to the speed of light, the wavelength of this energy is equal to the Compton wavelength for an electron.

At an orbital electron rotation speed of 466.97 m/s and below, a new linear spectrum of "stationary orbits" of the electron and de Broglie waves appears in the macrocosm. It becomes possible to exchange the energies of de Broglie waves and an electron when creating artificial conditions for the Bohr orbits of electrons in the macrocosm for any chemical element.

In the current microcosm, the conditions for the presence of parametric resonance between energies of various nature are their integral frequencies.

Thus, in relation to the conditions of "stationary orbits" of the macrocosm, there is a 100% possibility of the manifestation of parametric resonance between energies, because de Broglie wave energy and electron energy are always integer and in-phase.

By calculation, the conditions for the creation of "stationary Bohr orbits" for the conditions of the macrocosm of the electrons of any chemical element, including the following parameters, were established:

$v_1$=466.975 [m/s] is the peripheral velocity of an electron in the first "stationary orbit" of the macrocosm;

$R_{el.1}$=1.1614×10$^{-3}$*$N_{el.}$ [m] is the radius of the first "stationary orbit" of the macrocosm for any chemical element, where $N_{el.}$ is the atomic number of the chemical element according to the Mendeleev's Periodic Table;

$v^2 R_{el.}$=const or 253.2638998*$N_{el.}$ [m$^3$/s$^2$] is the product of the square of the peripheral velocity of the electron of the chemical element and the radius of its circumference of the corresponding "stationary wave", which value is constant for any stationary orbits and determines the discreteness of the presence of such orbits for a specific element of the Mendeleev's Periodic Table;

$n_1$=3.839545×10$^6$/$N_{el.}$ [rpm] is the number of revolutions of the electron (in the macrocosm of the "rotor" in the first "stationary orbit" of the macrocosm for any chemical element ($n_1$).

The prior art discloses methods for exciting minerals to solve various technological problems. These methods comprise transfer of vibrational energy to minerals using a source of mechanical vibrations that meets the conditions of mechanochemistry.

Similar methods and means of excitation were applied for destructive conversion of chemical bonds in liquids and gases at the molecular level. A drawback of the existing mechanochemistry is that it does not provide exact criteria for choosing resonant frequencies for such processing, which reduces the likelihood of efficiency.

There is a method of resonant excitation of a liquid (WO 01/58582), which contains bound hydrogen, by vibrational action on a liquid to destructively transform its chemical bonds at the molecular level, including the transmission of vibrational energy by a known source of mechanical vibrations interacting with a liquid a number of fundamental frequencies complying with an empirical relationship: $F=F_1 N^{-1/2}$, where N≥1 is a selected integer, $F_1$=63.9924 [kHz] is the basic oscillation frequency at N=1.

The said method for resonant excitation of liquids using a rotary source of mechanical vibrations comprises feeding a liquid to be treated into the cavity of the impeller rotating inside the stator, discharging the liquid from the cavity of the impeller through outlet openings uniformly distributed on its peripheral surface into an annular chamber bounded by a peripheral surface the impeller and the internal coaxial surface of the stator, liquid drainage from the annular chamber subject to the ratio $$nR=116141F,$$

where n [1/s],

R [m] is the radius of the peripheral surface of the impeller.

The above method for resonant excitation of a liquid provides a choice for only one chemical element (hydrogen).

The closest prior art method from patent No. RU 2232630, which comprises resonant excitation of a liquid containing oxygen and hydrogen and vibrational effects on a liquid for destructive transformation of its chemical bonds at the molecular level by transferring liquid vibrational energy and uses a mechanical source oscillations interacting with a liquid at least at one of a number of characteristic fundamental frequencies, is characterized in that the resonant excitation of the liquid on a frequency of the fundamental frequencies of the following series in accordance with the empirical relationship $$F_1 = F_{01} N^{-1/2} \text{ [kHz]} \pm (12.5 N^{-1})$$

where 50≥N≥1 is the selected integer;

$F_{01}$=7.99905 kHz is the frequency of the resonant excitation at N=1.

To implement the above method according to patent No. 223263 (patentee N. I. Selivanov), where a rotary hydrodynamic source is used as a source of mechanical vibrations, providing for the fluid to be treated into the cavity of the impeller rotating inside the stator, followed by the release of this fluid from the cavity the impeller through a series of outlet openings evenly distributed on its peripheral annular surface, while the liquid is discharged into an annular chamber bounded by the peripheral annular surface of the impeller and the inner coaxial surface of the stator, then liquid is withdrawn from the annular chamber into the collection chamber, while the resonant excitation of the liquid is carried out at the relationship $$nR_1=9.29128F_1 \text{ [m/s]}$$

where n [1/s] is the impeller rotation frequency,
R [m] is radius of the peripheral annular surface of the impeller.

The disadvantages of these methods and devices comprise their limited use, i.e. for two chemical elements being only hydrogen and oxygen, and excitation of oxygen is carried out only through excitation of hydrogen. They cannot be used, for example, for destruction of minerals or for separation of gas substances, because there is no algorithm to calculate excitation of all chemical elements of the Mendeleev's Periodic Table.

The closest prior art for the proposed device is a rotary pulse apparatus disclosed in M.A.Promtov's article "Rotary pulse devices and prospects for their use", at www.tstu.ru/r.php/r=structure.kafedra&sort=&id=3 (FIG. 1), which uses a pulsed action on a heterogeneous liquid to obtain highly dispersed emulsions and suspensions, intensification of dissolution processes, changes in the physicochemical parameters of the liquid, and also destruction of molecular compounds, including rotor (1) with channels (2), a stator (3) with channels (4), a housing (5), an inlet pipe (7), and an output pipe (8).

The working principle is as follows. The processed liquid is supplied through the inlet pipe (7) to the cavity of the rotor (1), passes through the channels (2) of the rotor, the stator channels (4), the working chamber formed by the housing (5), the cover (6) and exits through the outlet pipe (8). When the rotor rotates, its channels (2) are periodically combined with the stator channels (4). Leaving the stator channels (4), the liquid is collected in the working chamber and discharged through the outlet pipe (8). At the moment when the channels (2) of the rotor are blocked by the wall of the stator (3) in the cavity of the rotor, the pressure increases, and when these channels are combined, the pressure sharply decreases over a short period of time, as a result, a pressure pulse propagates into the channels (4) of the stator, and then an impulse of reduced pressure occurs. The liquid entering the stator channels (4) tends to exit from them and the inertial forces create tensile stress in the liquid, which causes cavitation.

The disadvantage of this device is the lack of a calculation algorithm for selective excitation of any chemical element from the Mendeleccv's Periodic Table.

SUMMARY

The technical problem to which the proposed technical solution is directed is developing a method and device to provide conditions for parametric resonance of the energy of "stationary de Broglie waves" and electromagnetic energy of the corresponding "Bohr orbits" for any chemical element in a substance of the macrocosm.

The technical result of the proposed method and device is creating specific conditions for parametric resonance between the energy of the "stationary de Broglie waves" and electromagnetic energy of the corresponding "Bohr orbits" for any chemical element in a substance of the macrocosm.

To solve the problem and achieve the claimed technical result, in the proposed method for creating in the macrocosm of parametric resonance between the energy of the "stationary de Broglie waves" and electromagnetic energy of the corresponding Bohr orbits in the atoms of a chemical element in a substance using a rotary exciter by feeding the substance into the internal cavity the rotor, passing it through the grooves evenly distributed over the peripheral annular surface of the rotor with subsequent release processed of the first substance, according to the main embodiment, the peripheral rotor speed for electrons of any chemical element of the first stationary orbit of the macrocosm is $v_1=466.975$ m/s, while the parametric resonance is carried out at a frequency $n=n_1/k^{3/2}$ [rpm], where $n_1$ is the number of revolutions of an electron in the first stationary orbit, for any chemical element $n1=3.839545\times10^6/N_{el.}$ [rpm], k is the number of radial grooves of the rotor, $N_{el.}$ is the atomic number of the chemical element in the substance.

Wherein:
atomic number of the chemical element in the composition of the substance is determined according to the Mendeleev's Periodic Table.;
substance can be in any physical state (solid, liquid, gas);
type of rotation drive of the rotary exciter is determined by the required number of revolutions and can be either mechanical, or electrical, or another, allowing to provide the given number of revolutions.

The problem given in terms of creating conditions for parametric resonance of energy of stationary de Broglie waves and the electromagnetic energy of the corresponding Bohr orbits in the atoms of any chemical element in the substance in the macrocosm allows you to implement the above method using the proposed device in the framework of a single inventive concept. A device for creating a parametric resonance of the energy of the "stationary de Broglie waves" and the electromagnetic energy of the corresponding "Bohr orbits" in the atoms of any chemical element from the substance using a rotary exciter, contains a housing with a base and a side wall, mounted on the shaft, while the inner space of the housing made in the form of individual grooves evenly distributed relative to the outer surface of the rotor, a peripheral annular wall providing a gap for the release of the processed substances from the device, inlet and outlet nozzles, means for driving the rotor with a given speed. According to the main embodiment, the value of the outer radius of the rotor is $R=R_{el.1}*k$, where $R_{el.1}$ is the radius of the first stationary orbit of the macrocosm for the electrons of the chemical element $(R_{el.1}=1.1614\times10^{-3}*N_{el.}$ [m], where Nel is the atomic number of the chemical element according to the Mendeleev's Periodic Table, k is the number of rotor grooves, which is calculated by the formula $k=(n_1/n)^{3/2}$ and selected from the nearest integral value, where $n_1$ is the number of electron revolutions in the first stationary orbit of the macrocosm for any chemical element $n_1=3.839545\times10^6/N_{el.}$ [rpm], n is the rotor speed, and the width of the radial groove is calculated by the formula $h=3.648677\times10^{-3}/N_{el.}$.

With this embodiment of the device, parametric resonance is achieved between the energy of the "stationary de Broglie waves" and electromagnetic energy of the corresponding Bohr orbits in the atoms of any chemical element in a substance in the macrocosm.

According to a preferred embodiment of the proposed device:
inner radius (r) of the rotor is set constructively;
size of the gap between the outer surface of the rotor and the peripheral outer wall of the stator is performed with the possibility of unhindered withdrawal of the spent substance;

when processing a substance in a liquid or gas state, a hermetic drive of a rotary agent is used;

when processing a liquid or gas substance, the spatial orientation of the rotor exciter is arbitrary;

when processing solids, the spatial orientation of the rotor exciter is preferably vertical;

when the size of the minerals is more than the cross section of the grooves of the rotor exciter, they can pass through the gap between the outer surface of the rotor with the peripheral outer surface of the stator;

height (L) of the radial grooves is made with the possibility of ensuring optimal passage of the excited substance.

depth of the grooves of the rotor is determined by the difference between the outer radius (R) and the inner radius (r).

The essence of the proposed method is based on the following.

To excite the "electronic orbits" of a given chemical element, a rotational movement is set for this element in the composition of a substance (solid, liquid or gas) with a given rotation speed at a certain radius of the rotor exciter. In a chemical element, conditions are created for exciting the energy of the electron shells to a value of $E=13.6xz^2$ eV, where z is the atomic number of the chemical element according to the Mendeleev's Periodic Table. Excitation of the shells leads to ionization of electrons, which in turn leads to ionization of chemical bonds in matter. The manifestation of ionization is illustrated by the following:

for solids (minerals): there is forced destruction of the chemical bonds of the mineral, which leads to destruction of the mineral structure;

for liquid substances: forced destruction/weakening of the chemical bonds of the substance, which leads to destruction of molecular bonds when leaving the excitation zone;

for gases: destruction of chemical bonds when creating the conditions for the correct formation of de Broglie waves.

The proposed method for creating parametric resonance of the energy of the "stationary de Broglie waves" and electromagnetic energy of the corresponding "Bohr orbits" of the atoms of a chemical element from the composition of the substance in the macrocosm is implemented with the device.

The accompanying figures show a device for creating parametric resonance between the energy of the "stationary de Broglie waves" and electromagnetic energy of the corresponding "Bohr orbits" in the atoms of a chemical element from a substance in the macrocosm.

Figures 1, 2:
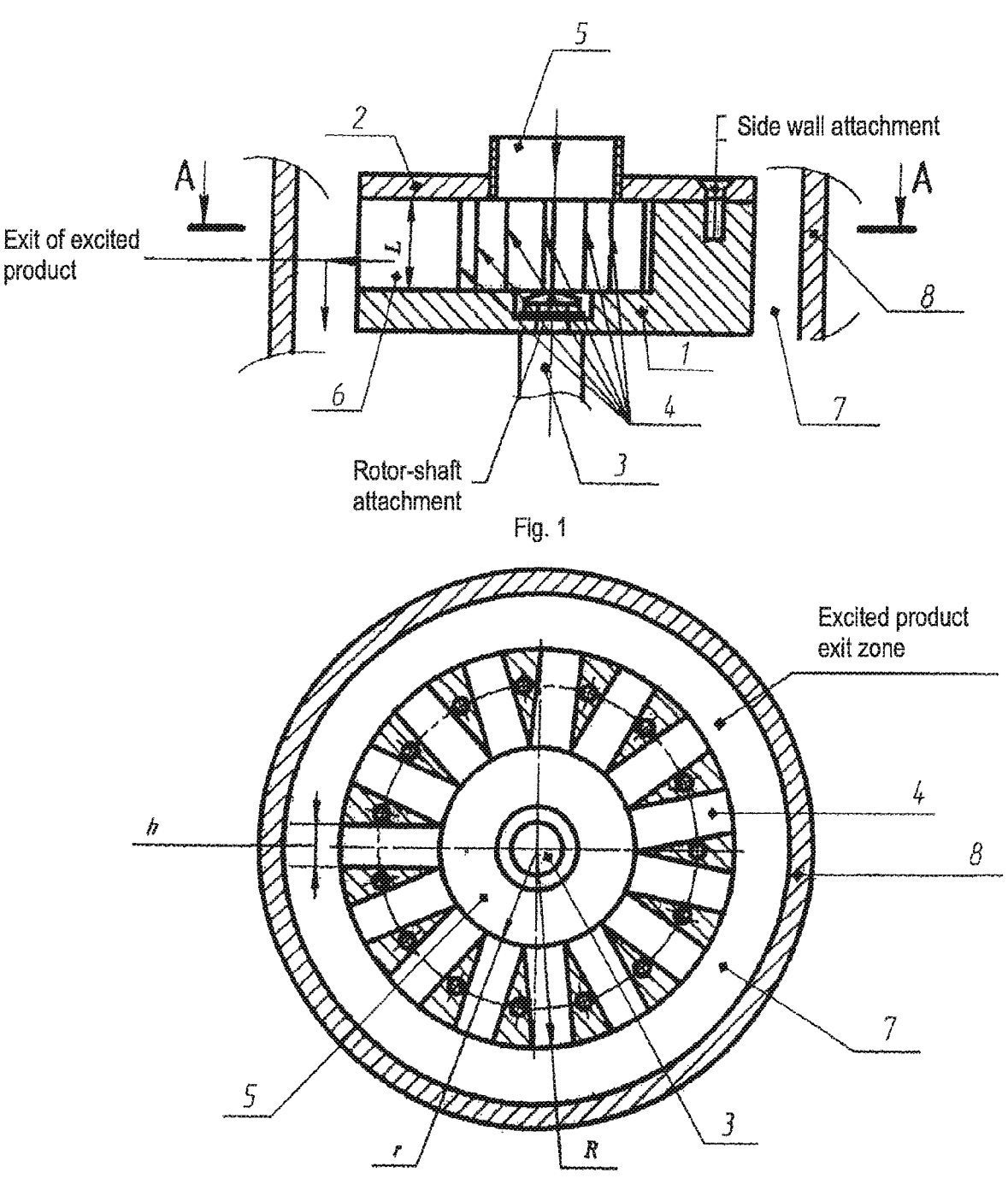
FIG. 1 is a vertical section through a device for creating parametric resonance of energy of "stationary de Broglie waves" and the electromagnetic energy of the corresponding "Bohr orbits" in the atoms of a chemical element from a substance in the macrocosm.
FIG. 2 is a horizontal section of the same device.

The device comprises a rotor mounted on a shaft 3 with a standard rotation drive, including a base 1, a side wall 2, while the inner cavity of the rotor contains grooves in the form of hollow segments 4 uniformly distributed relative to the outer surface of the rotor, inlet pipe 5, outlet pipe 6, and peripheral annular wall 8.

Detailed Description

The chemical element to be selectively excited in the starting substance (material object) is specified. The atomic number of the excited chemical element in the substance is established according to the Mendeleev's Periodic Table. The rotor groove width $h=3.648677\times10^{-3}/N_{el}$ is calculated. Then the outer radius (R) of the rotor, which is optimal for this design, is calculated by the formula $R=R_{el.1}*k$ by selecting the number (k) of grooves. Then, the number of rotor rotations is calculated taking into account the number (k) of grooves and the atomic number (z) of the excited chemical element $n=n1/k^{3/2}$ [rpm]. The inner radius (r) of the rotor is specified constructively being at least ½R.

The substance with the excited chemical element (solid, liquid or gas) through the inlet pipe 5 enters the inner (hollow) part of the rotor, which is made in the form of hollow segments 4, which allow the passage of matter from the central part of the rotor to its peripheral part. The incoming substance due to centrifugal acceleration enters the exit zone 7 of the excited product and is discharged.

When the substance passes through the grooves 4 of the rotor, the latter experiences resonant excitation of the chemical bonds of the element, i.e. in a chemical element, the conditions for the excitation of its electronic shells are created up to the value $E=13.6*z^2$ eV, where z is the serial number of the chemical element. The excitation of electron shells causes their ionization, which in turn leads to the excitation of chemical bonds of this element in a substance.

The said ionization for various physical states of a substance is as follows.

For solids, in particular minerals, destruction begins to proceed at the microscopic level and occurs primarily in the zone of contact of the destructive element with the mineral and is accompanied by a break in the bonds between the grains of the mineral (crystal) in the form of microcracks or shears along the sliding surfaces, or a violation of chemical bonds in the crystal itself. Then the process goes into macroscopic destruction, the zones of which reach about 10 mm or more, which is accompanied by microcracks that disrupt continuity of the mineral in large volumes. Bulk destruction of minerals is most effective since it requires low energy costs.

For liquid substances: forced destruction or weakening of the chemical bonds of the substance leads to the appearance of local excitation zones or intramolecular ordering of chemical bonds of the excited chemical element when leaving the excitation zone, i.e. to destruction of the original molecules of the substance.

For gases: ionization allows synthesis of a specific excited chemical element when leaving the excitation zone, i.e. there is synthesis of certain chemical compounds of the components of various gases.

In this case, it is necessary to ensure the creation conditions for the correct formation of de Broglie waves inherent for a given radius during circular rotation of matter, which is also determined by the groove width (h) and number (k).

Experimental Determination and Testing

Consider calculation of the rotor parameters and the results of experimental testing the proposed method and device for implementation thereof for example of parametric excitation of silicon atoms.

Calculation of rotor geometry for parametric excitation of energy of silicon atoms:

1. The calculation of the parameters of the rotor exciter:

Silicon $N_{el.}$ is 14 according to the Mendeleev's Periodic Table.

The rotor speed n is about 3000 rpm (set by the number of revolutions of the apparatus drive (3-phase electric motor with a frequency of 50 Hz), where the rotor is installed).

Then the number of grooves is calculated as follows:

$$k=(n/n)^{2/3}=20.2934.$$

The nearest integer 21 is taken as the basis of the calculation.

The required number of revolutions of the rotor at k=21 is $$n=2.742532\times10^5/21^{3/2}=2850 \text{ rpm}$$

The outer radius of the rotor will be:

$R=R_{el.1}*21=3.414545\times10^{-1}$ [m], outer diameter of the rotor=$6.829090\times10^{-1}$ [m].

The groove height (L) is determined by the design of the apparatus, the groove depth is determined as the difference between the rotor outer radius (R) and inner radius (r), while:

$$r=\frac{1}{2}R$$

The rotor groove width h=3.648677*14=51.08 [m]

The zones of parametric energy resonance are shown as 7 in FIG. 2.

The maximum fraction size for parametric excitation is determined by the design of the apparatus.

To excite atoms of chemical elements in liquid and gas substances, it is allowed to use the outer shells of tanks, pipelines, with these substances as a peripheral wall.

Exemplary Embodiment of Invention

Grinding of quartz ($SiO_2$) was carried out on a rotor with the above parameters. Express analysis data are given in Table 1.

TABLE 1

| Initial quartz sand with Mohs hardness of 7 | | | | | | | | | |
|---|---|---|---|---|---|---|---|---|---|
| Fraction, mm | +0.8 | +0.5 | +0.4 | +0.3 | +0.2 | +0.16 | +0.1 | +0.063 | +0.045 | −0.045 |
| Content, % | 0.2 | 7.2 | 6.0 | 17.4 | 54.3 | 10.4 | 1.65 | 2.85 | — | — |
| Initial quartz sand with Mohs hardness of 7 upon single pass through rotor | | | | | | | | | |
| Fraction, mm | +0.8 | | | | | | | | |
| Content, % | 0 | 1.8 | 0.9 | 3.5 | 6.2 | 10.2 | 21.2 | 6.1 | 4.4 | 45.7 |

The express test indicates that upon a single pass of quartz through the rotor the destructed quartz fractions of less than 45 microns amounted 45.7% of the total weight, therefore, parametric resonance for the destruction of the mineral is clearly observed.

As shown by the experimental test, the proposed device design allows for single pass of quartz ($SiO_2$) with a fraction of +0.2 mm to destruct it to a fraction from +100 to −45 microns. The fraction from 20 to 50 mm is destructed o 50 microns in the amount of 30% by weight. Mechanical destruction (wear) of internal metal parts is almost absent. Quartz grinding of 3000 kg/h requires no more than 30 kW/h of electric power.

Exemplary Embodiment of Invention

Example II

Calculation of Rotor Geometry for Parametric Sulfur Excitation

Sulfur $N_{el.}$ is 16 according to the Mendeleev's Periodic Table.

The rotor speed n is about 3000 rpm (set by the number of revolutions of the apparatus drive (3-phase electric motor with a frequency of 50 Hz), where the rotor is installed).

Then the number of grooves is calculated as follows:

$$k=(n/n)^{2/3}=18.565.$$

The nearest integer 19 is taken as the basis of the calculation.

The required number of revolutions of the rotor at k=19 is $$n=2.399716\times10^5/19^{3/2}=2898 \text{ rpm}$$

The outer radius of the rotor will be:

$R=R_{el.1}*19=3.53\times10^{-1}$ [m], outer diameter of the rotor=$7.06\times10^{-1}$ [m].

The groove height (L) is determined by the design of the apparatus, the groove depth is determined as the difference between the rotor outer radius (R) and inner radius (r), while:

$$r=\frac{1}{2}R$$

The rotor groove width h=3.648677*16=58.38 [m]

It should be noted that additional conditions are required for the proper formation of de Broglie waves.

INDUSTRIAL APPLICABILITY

The practical application of the proposed technical solution has been tested in several directions using the proposed device.

1. When changing the rheology of crude oil, the following results were obtained decrease in viscosity and density;

increase the yield of light oil products, operating refineries by 8-15 percent;

lowering the viscosity of fuel oil and pour point;

comprehensive, waste-free processing of "acidic" fuel oil based on sulfur removal;

production of homogeneous water-fuel emulsions;

dehydration of "trap" oil and fuel oil (sludge collectors);

reduction in the percentage of sulfur content in oil and fuel oil;

increase in the octane number of straight-run gasolines;

fine grinding of coal.

2. The destruction of minerals when exposed to parametric resonance:

selective destruction of the crystal lattice of minerals;

dry enrichment of chemical elements from the composition of minerals.

Investigated promising areas:

design of oil refineries based on the effect of selective excitation of electronic shells (H, C, S);

increase in the octane number of straight-run gasolines;

liquefaction of coal.

The invention claimed is:

1. A device configured for creating conditions for parametric resonance of energy of stationary de Broglie waves and the electromagnetic energy of the corresponding Bohr orbits in the atoms of a selected chemical element in a solid, liquid, or gaseous substance, comprising a housing having a base,
   a side wall, and
     a rotor having an outer radius at an outer surface and mounted on a shaft, an inner cavity of the rotor containing grooves in the form of hollow segments uniformly distributed relative to an outer surface of the rotor,
a peripheral annular wall having an inner surface and providing a gap between the outer surface of the rotor and the inner surface of the peripheral annular wall for the release of the solid, liquid, or gaseous substance containing the selected chemical element from the device,
an inlet pipe configured to feed the solid, liquid, or gaseous substance to the inner cavity,
an outlet pipe configured to expel a solid, liquid, or gaseous substance from the inner cavity to the gap, and a rotation drive configured to drive the rotor with a calculated number of rotor revolutions per minute,
wherein the value of the outer radius of the rotor at the outer surface of the rotor is $R=R_{el.1}*k$, where $R_{el.1}=1.1614\times10^{-3}*N_{el.}$ (m), where $N_{el.}$ is the atomic number of the selected chemical element according to the Mendeleev's Periodic Table, wherein $N_{el.}$ is greater than 1, whereby an inner radius of the rotor is at least $\frac{1}{2}R$, the number of grooves of the rotor are calculated by the formula $k=(n_1/n)^{2/3}$ and selected from the nearest integral value, where $n_1=3.839545\times10^6/N_{el.}$ (rpm), n is the number of rotor revolutions per minute, and a radial groove width of the grooves is determined by the formula $h=3.648677\times10^{-3}*N_{el.}$ (m) and a depth of the grooves of the rotor is determined by the difference between the outer radius and the inner radius.

2. The device according to claim 1, wherein the gap between the outer surface of the rotor and the peripheral annular wall is configured to provide unhindered withdrawal of the substance.

3. The device according to claim 1, wherein the height (L) of the radial grooves is configured to provide for passage of the substance.

* * * * *